L. B. DORR.
AEROPLANE.
APPLICATION FILED JULY 26, 1917.

1,303,544.

Patented May 13, 1919.

Inventor:
L. Bradley Dorr,
by
Atty.

UNITED STATES PATENT OFFICE.

LUCIUS BRADLEY DORR, OF BUFFALO, NEW YORK.

AEROPLANE.

1,303,544.   Specification of Letters Patent.   Patented May 13, 1919.

Application filed July 26, 1917. Serial No. 182,896

*To all whom it may concern:*

Be it known that I, LUCIUS BRADLEY DORR, a citizen of the United States, residing at Buffalo, in the county of Erie and State of New York, have invented certain new and useful Improvements in Aeroplanes, of which the following is a specification.

This invention relates to aeroplanes, and more particularly to improvements in the construction of the planes.

The object of this invention is to increase the lifting and propelling action of the planes.

Without attempting scientific statement of the phenomena involved in the action of a plane of a flying machine (which phenomena appear not to be wholly understood), it may be stated that, in former constructions, the lifting effect of the plane or planes has been chiefly, if not entirely, upon the under side of the plane,—that is to say, that it has been chiefly the action of an inclined or convex-curved surface traveling against the air. It is also now understood that there is a tendency of the air adjacent the upper side of a plane to flow from the center or stream line at an angle to the stream line toward the outward edges of the plane. Broadly stated, my invention consists, in order to take advantage of this outward flow of air on top of the wing surfaces and utilize it for lifting and forward thrust of the wings, in erecting ribs upon said surfaces which are nearly parallel with the outward flow. These ribs, as described hereafter in detail, have several effects. First the pressure of the air outward against the ribs accelerates the forward movement of the wing. Second, the control of the volume of air flowing over the surface of the wing and the spreading of the air over a larger surface rarefies or produces a vacuum effect between the ribs, and a consequent lifting action. Third, the air flowing between two ribs of unequal length causes a cyclonic or rotating effect upon the air, which helps materially in producing a vacuum upon the upper surface of the planes, which condition results in adding to the thrust upon the under surface due to travel the thrust of a vacuum condition.

Referring to the drawings herewith, which are diagrammatic in character and not to proportion or scale,—

Figure 1:
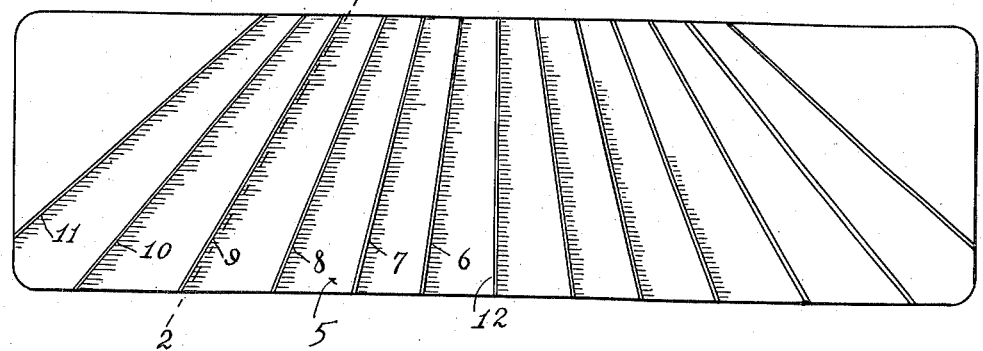
Figure 1 is a top plan view of a plane provided with my improvements.
Figure 2:
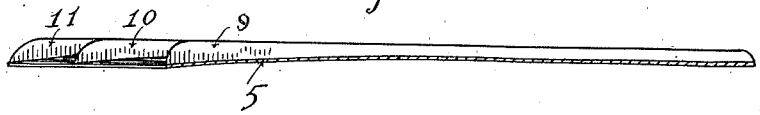
Fig. 2 is an enlarged section on the line 2—2 of Fig. 1.
Figure 3:
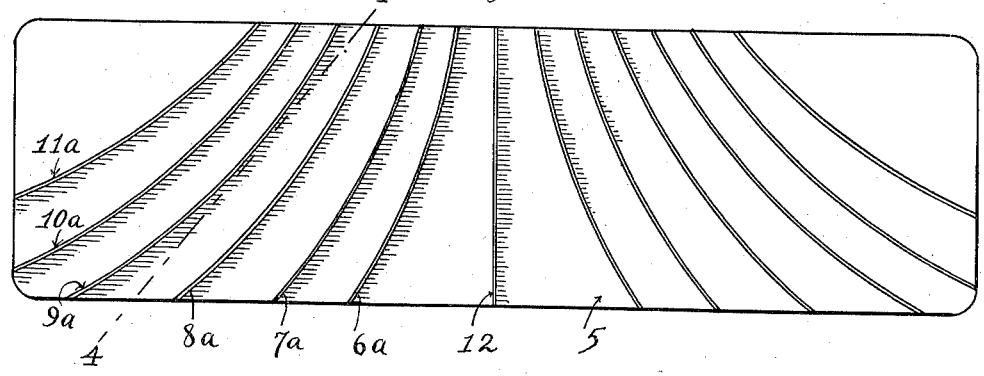

Fig. 3, similar to Fig. 1, shows a modified form of construction.

Figure 4:
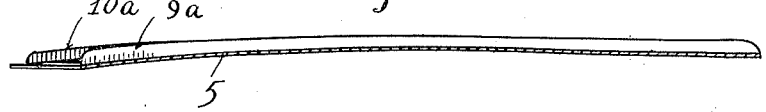

Fig. 4 is an enlarged section on the line 4—4 of Fig. 3.

The numeral 5 indicates the plane proper, which may be made in any desired form or of any desired material and provided with the desired form of supports and connections, which are not shown.

Secured to and conforming to the curvature of the upper surface of the plane are upstanding ribs 6, 7, 8, 9, 10, 11, etc. The center rib 12 is upon the center stream line of the plane and practically divides it into two equal portions with reference to the effect produced. However, this rib 12 may be dispensed with, since it has little if any action other than that of making a slightly sharper division of the diverging currents.

The ribs 6, 7, 8, 9, 10, 11, etc., are arranged at intervals or spaces of any desired extent, and are arranged at increasing angularity from the center,—that is to say, the rib 6 is at a slight angle to the center line, while the rib 7 is at a slightly greater angle, the rib 8 at a still greater angle, and so on in either direction from the center line. The spacing, frequency, or height of these ribs may be determined for any desired type of construction. Preferably, however, they have a greater upstand adjacent the rear of the plane than at the forward or cutting edge.

The action of these ribs when the plane is traveling is, as above stated, to create a slight vacuum or rarefied condition adjacent the upper surface of the plane and especially adjacent the rear portion of said surface; also by the deflecting and impinging effect to increase the forward thrust of the plane.

In Figs. 3 and 4 I have shown a modified form of construction. Here the ribs 6ª, 7ª, 8ª, 9ª, 10ª, etc., are curved outwardly rearwardly as shown, they also may be slightly curved upon their upper edges, as shown, to reduce the upstand at the rear portion of the plane.

The modifications shown in Figs. 3 and 4 are merely illustrative of the fact that the ribs may be constructed and arranged in various ways and still attain the end of my invention.

It will be understood that my invention is applicable to a flying-machine having one or more planes, and that where more than a single plane is used, either one or more of the planes may be provided with my improvements.

Having thus described my invention, I claim:

1. In an aeroplane, in combination with a plane, upwardly-extending and diverging projections thereon arranged to force the subjacent air laterally from the center stream line.

2. In an aeroplane, transversely and divergingly positioned ribs secured thereto, and increasingly diverging from the center line of said plane, whereby a slight vacuum effect is produced upon the upper surface of said plane.

3. The combination with a plane of an aeroplane, of means on said plane for increasing the normal lateral flow from the center stream line upon the upper surface of said plane.

4. In an aeroplane, a plane, transversely increasingly diverging upstanding ribs thereon forming troughs of increasing cross-section from the front to the rear edge of the plane, whereby, coacting with the outward flow of the air, a cyclonic action is created which tends to lift and propel the plane.

L. BRADLEY DORR.